(12) United States Patent
Yokoyama et al.

(10) Patent No.: US 6,504,637 B1
(45) Date of Patent: Jan. 7, 2003

(54) OPTICAL REGENERATION CIRCUIT FOR REGENERATING SIGNAL WITH DETERIORATED SIGNAL TO NOISE RATIO BY MEANS OF SATURABLE ABSORPTION ELEMENT

(75) Inventors: Ryu Yokoyama; Satoshi Ishii, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,069

(22) Filed: Mar. 10, 1999

(30) Foreign Application Priority Data

Mar. 13, 1998 (JP) .............................. 10-063384

(51) Int. Cl.[7] .............................................. H04B 10/02
(52) U.S. Cl. ...................... 359/176; 359/161; 359/176; 359/179; 359/244; 359/339
(58) Field of Search ................................. 359/176, 179, 359/339, 244, 161

(56) References Cited

U.S. PATENT DOCUMENTS

| | | | | |
|---|---|---|---|---|
| 4,822,147 A | * | 4/1989 | Park | |
| 5,532,861 A | * | 7/1996 | Pirio et al. | |
| 5,726,787 A | * | 3/1998 | Haus et al. | |
| 5,778,015 A | * | 7/1998 | Gunning et al. | |
| 5,805,327 A | * | 9/1998 | Usami et al. | |

FOREIGN PATENT DOCUMENTS

| | | |
|---|---|---|
| JP | 7-183848 | 7/1995 |
| JP | 9-200147 | 7/1997 |

* cited by examiner

*Primary Examiner*—Leslie Pascal
*Assistant Examiner*—Dzung Tran
(74) *Attorney, Agent, or Firm*—Scully, Scott, Murphy & Presser

(57) ABSTRACT

An optical transmission system having an optical regeneration circuit for regenerating a signal with a deteriorated signal to noise ratio. A signal light at wavelength $\lambda 1$ which includes a noise light is composed with a continuous light at wavelength $\lambda 2$ outputted from a light source to obtain a composed signal light in an optical coupler. The composed signal light is passed through a saturable absorption type optical element which transmits only the signal light having a light intensity equal to or greater than a threshold value, thereby removing the included noise light. From the signal light, only the signal at the same wavelength $\lambda 2$ as the wavelength of the continuous light is extracted by a wavelength divider and data signal of the incident signal light is replicated in the continuous light and outputted. Thus, a signal light having no deterioration of the signal to noise ratio at wavelength $\lambda 2$ can be regenerated from the signal light having the deteriorated signal to noise ratio.

8 Claims, 10 Drawing Sheets

OPTICAL REGENERATION CIRCUIT FOR REGENERATING SIGNAL WITH DETERIORATED SIGNAL TO NOISE RATIO BY MEANS OF SATURABLE ABSORPTION ELEMENT

BACKGROUND OF THE INVENTION

1. Field of the Invention

The present invention relates to an optical transmission system, and more particularly to an optical regeneration circuit for regenerating a signal having a deteriorated signal to noise ratio.

2. Description of the Related Art

FIG. 1 shows a schematic configuration of a conventional optical transmission system using an optical direct amplifying transmission scheme.

This optical transmission system comprises an optical transmitter 9 for transmitting a signal light; an optical receiver 10 for receiving a signal light; a plurality of optical amplifiers 7 for amplifying the applied signal light and outputting the amplified signal light; a plurality of optical fibers 6 in the forms of rare-earth doped optical fibers, on which excited light is incident, for connecting between optical transmitter 9 and the first one of optical amplifiers 7, between adjacent optical amplifiers 7, and between the last one of optical amplifiers 7 and optical receiver 10.

This optical transmission system has the following problems. Each of optical amplifiers 7, when amplifying a signal light, superimposes a spontaneous emission optical noise generated inside upon the optical signal. Thus, in the optical transmission system having optical amplifiers 7 connected in multiple stages, the spontaneous emission optical noise is accumulated while the signal light is propagated through the optical amplifiers, thereby causing deterioration in the signal to noise ratio. In addition, the signal to noise ratio is also deteriorated by a waveform distortion generated when a signal light is propagated through the plurality of optical fibers 6. Thus, in the conventional optical transmission system, favorable optical signal transmission can not be performed especially in transmission for a long distance.

SUMMARY OF THE INVENTION

It is an object of the present invention to provide an optical transmission system capable of favorable transmission over a long distance without deteriorating the signal to noise ratio.

To achieve the above-mentioned object, the optical transmission system according to the present invention, comprises an optical transmitter, an optical receiver, an optical fiber, and an optical amplifier, employs an optical direct amplifying and relaying transmission scheme, is characterized by an optical regeneration circuit on the path of the optical fiber.

The optical regeneration circuit according to the present invention comprises an optical wavelength selector, a light source, an optical coupler, a saturable absorption type optical element, and a wavelength divider.

The optical wavelength selector passes therethrough, from an incident signal light which includes a noise light, only the component with a wavelength of the signal light. The optical coupler means synthesizes the signal light outputted from the optical wavelength selector and the continuous light outputted from the light source to output the synthesized light. The saturable absorption type optical element absorbs almost all the composed signal light received from the optical coupler when the composed signal light has a light intensity lower than threshold value and transmits the composed signal light received from the optical coupler when the composed signal light has a light intensity equal to or greater than the threshold value. The wavelength divider divides only the component with the same wavelength as the wavelength of the continuous light from the composed signal light outputted from the saturable absorption type optical element to output the divided light as a regenerated signal light.

The signal light which includes a noise light is composed with the continuous light at a different wavelength to obtain the composed signal light. This composed signal light passes through the saturable absorption type optical element, thereby transmitting only the composed signal light having a light intensity equal to or greater than the threshold value to remove the noise light. From the composed signal light having the light intensity equal to or greater than the threshold value, a signal with the same wavelength as the wavelength of the continuous light is extracted by the wavelength divider. In this way, the incident signal light is replicated in the continuous light and outputted. Therefore, the signal light having no deterioration of the signal to noise ratio at a wavelength different from the wavelength of the applied signal light can be regenerated from the signal light having the deteriorated signal to noise ratio.

Also, according to an embodiment of the present invention, an optical amplifier is further provided which is interposed between the optical coupler and the saturable absorption type optical element. Thus, a light intensity of a signal light to be applied to the saturable absorption type optical element can be set at an optimal level for the threshold value of the saturable absorption type optical element.

Additionally, another optical regeneration circuit according to the present invention comprises an optical wavelength selector, a light source, a saturable absorption type optical element, and a wavelength divider When an added value of a light intensity of a continuous light from the light source applied at one terminal and a light intensity of a signal light applied at the other terminal is below a threshold value of a saturable absorption region, the saturable absorption type optical element absorbs almost all the continuous light and the signal light. Conversely, when the added value of the light intensity of the continuous light from the source applied at the one terminal and the light intensity of the signal light applied at the other terminal is below the threshold value, the saturable absorption type optical element allows the continuous light to pass therethrough and provides the light as a regenerated signal light at the other terminal.

The optical divider includes a first terminal connected to the optical wavelength selector, a second terminal connected to the saturable absorption type optical element and an output terminal through which the regenerated signal light is transmitted to the outside. The signal light received from the optical wavelength selector at the first terminal is supplied to the saturable absorption type optical element through the second terminal and the regenerated signal light received from the saturable absorption type optical element at the second terminal is outputted at the output terminal.

In the optical divider, the signal light received from the outside is different from the continuous light outputted from the light source in the traveling direction, so that a wavelength of the signal light received from the outside and a wavelength of the continuous light received from the light source can be made equal to each other.

According to an embodiment of the present invention, the wavelength of the signal light and the wavelength of the continuous light is set to be substantially equal to each other.

According to another embodiment of the present invention, the optical divider is an optical circulator.

According to yet another embodiment of the present invention, the optical wavelength selector is an optical band pass filter.

An optical transmission system according to the present invention, comprises an optical transmitter, an optical receiver, an optical fiber, and an optical amplifier and employs a wavelength multiplexing transmission scheme in which a plurality of signal lights having different wavelengths are composed and transmitted in a single optical transmission path, and characterized by an optical regeneration device on the path of the optical fiber.

This optical regeneration device comprises a wavelength separator, the aforementioned plurality of optical regeneration circuits, and a wavelength divider.

According to a still another embodiment of the present invention, optical amplifiers are provided at an input terminal of the wavelength separator, at input terminals and output terminals of the respective optical regeneration circuits, and at an output terminal of the wavelength multiplexer. Therefore, light intensities of the signal lights to be applied to the wavelength separator, the saturable absorption type optical elements of the respective optical regeneration circuits, the wavelength multiplexer, and the optical fiber can be set independently at respective optimal levels.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
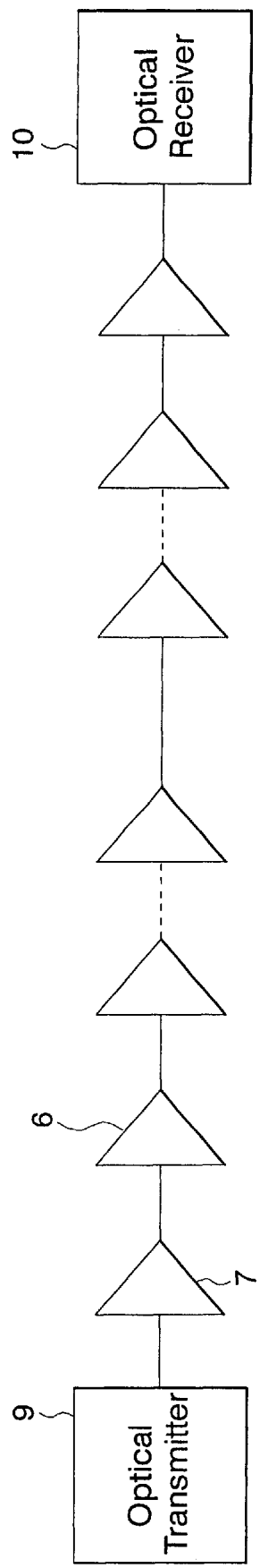
FIG. 1 is a block diagram showing a configuration of a conventional optical transmission system using an optical direct amplifying transmission scheme.
Figure 2:
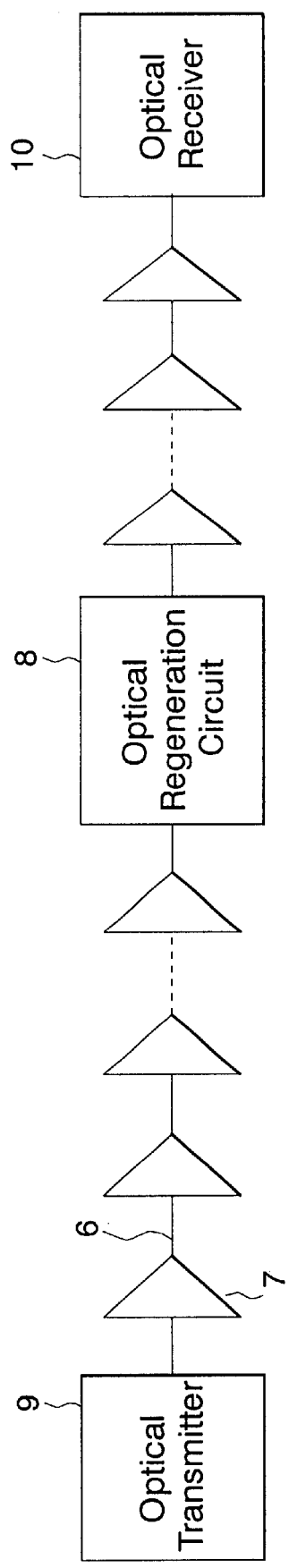
FIG. 2 is a block diagram showing a configuration of an optical transmission system using an optical regeneration circuit according to a first embodiment of the present invention.

Referring now to FIG. 2, there is shown an optical transmission system according to a first embodiment of the present invention which includes optical regeneration circuit 8 interposed between optical amplifiers 7 in the conventional optical transmission system in FIG. 1.

Figure 3:
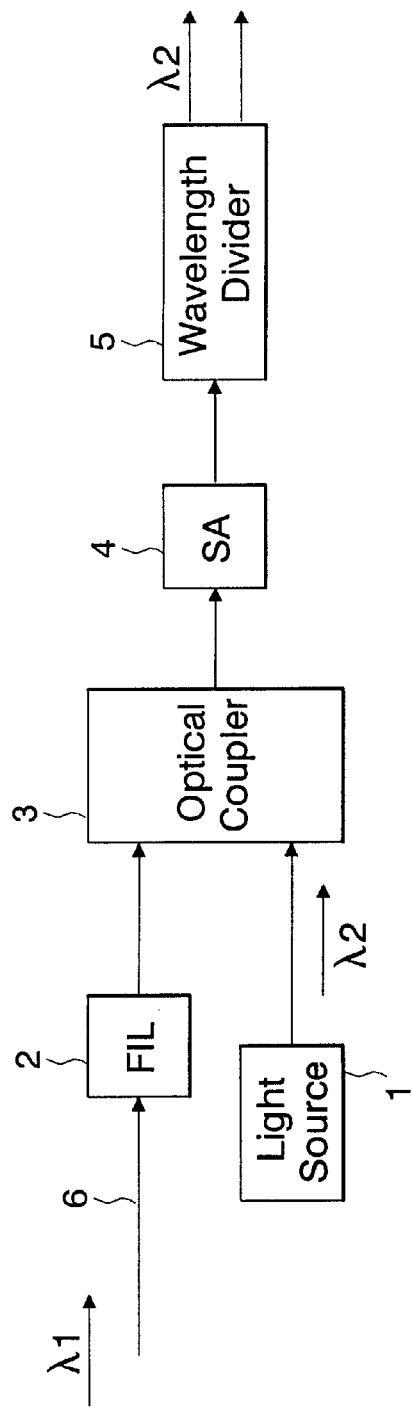
FIG. 3 is a block diagram showing a configuration of optical regeneration circuit 8 in FIG. 2.

Optical regeneration circuit 8 comprises light source 1, optical wavelength selector (FIL) 2, optical coupler 3, saturable absorption type optical element (SA) 4, and wavelength divider 5, as shown in FIG. 3.

Light source 1 provides a continuous light at wavelength $\lambda 2$. Optical wavelength selector 2 passes only the signal component at wavelength $\lambda 1$ of an incident signal light. This optical wavelength selector 2 may be configured in the forms of optical band pass filter. Optical coupler 3 synthesizes the signal light outputted from optical wavelength selector 2 and the continuous light outputted from light source 1 to output the synthesized light as a composed signal light. Saturable absorption type optical element 4, which is an optical element having a saturable absorption region, absorbs almost all the composed signal light received from optical coupler 3 when the composed signal light has a light intensity lower than a certain threshold value, and causes the composed signal light from optical coupler 3 to pass therethrough when the composed signal light has a light intensity equal to or greater than the threshold value. All example of such saturable absorption type optical element 4, implemented through the application of a reverse bias to a semiconductor laser amplifier, has been reported in the following literature: Technical Digest of CPT' 98 (CPT' 98=International Topical Workshop on Contemporary Photonic Technologies), "Optical noise reduction by a semiconductor waveguide saturable absorber". Yoichi Hashimoto et al. Pp215–216, Jan. 12–14, 1989. In corporation with IEICE Electronics Society & JSAP & IEEE-LEOS & OSA Wavelength divider 5 divides only the signal light at wavelength $\lambda 2$ from the output from saturable absorption type optical element 4 and outputs the divided signal light.

Figure 4:
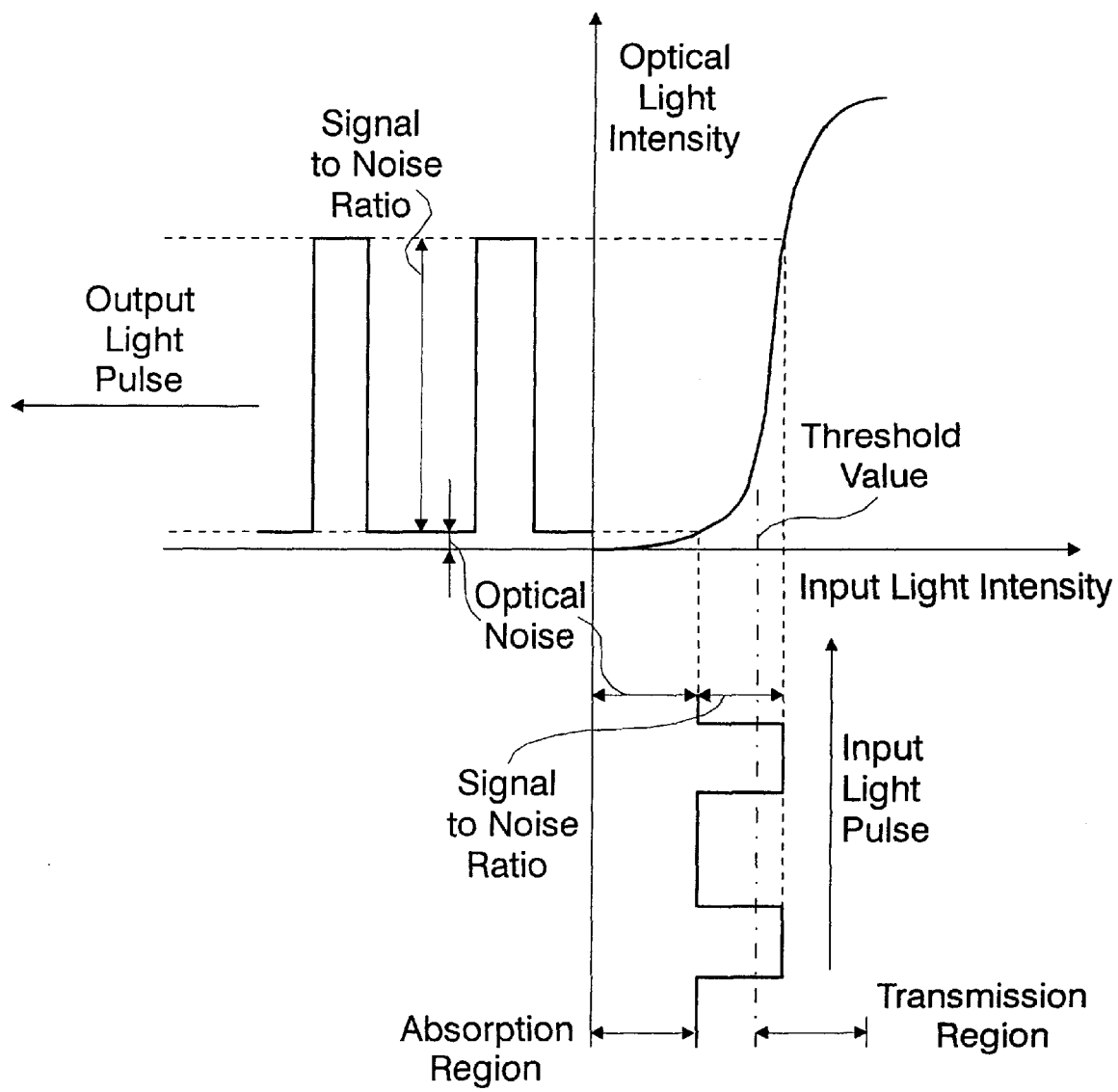
FIG. 4 is a diagram showing light passing characteristics of saturable absorption type optical element 4 in FIG. 3.

Next, the light passing characteristics of saturable absorption type optical element 4 will be described with reference to FIG. 4. Saturable absorption type optical element 4 has nonlinear transmission characteristics which depends on an applied light intensity. Thus, as shown in FIG. 4, a signal light with a high light intensity above the threshold value exceeds the absorption capacity of saturable absorption type optical element 4 (i.e. is saturated) and is caused to pass through, while a signal light with a low light intensity below the threshold value is substantially absorbed by saturable absorption type optical element 4 to be attenuated. An area of the light intensity in which the applied signal light is caused to pass through is referred to as a transmission area, and an area of the light intensity in which the applied signal light is absorbed is referred to as an absorption region. Saturable absorption type optical element 4 is effective to suppress a spontaneous emission optical noise with a low light intensity.

It should be noted that the threshold value level of saturable absorption type optical element 4 is set such that the light intensity of the composed signal light outputted from optical coupler 3 is in the transmission area when signal data is active (hereinafter referred to as H level), while the light intensity of the composed signal light is in the absorption region when the signal data is inactive (hereinafter referred to as L level).

Next, the operation of optical regeneration circuit in this embodiment will be described with reference to FIG. 5a to FIG. 5e which show changes in the signal level over time.

The output of optical wavelength selector 2 includes only the selected component at signal light wavelength $\lambda 1$ of the signal light applied through optical fiber 6. Since this signal light has been relayed through multiple stages, it involves much spontaneous emission optical noise. This signal light is shown in FIG. 5a.

The continuous light at a wavelength $\lambda 2$ is outputted from light source 1 at a constant level. This continuous light is shown in FIG. 5b where the alternate long and short dash line shows the threshold value level of saturable absorption type optical element 4. It should be noted that the output level of light source 1 is set to be lower than the threshold value level, as shown in FIG. 5b. Also, the continuous light is shown by hatching for distinction from the signal light outputted from optical wavelength selector 2.

Figure 5A:
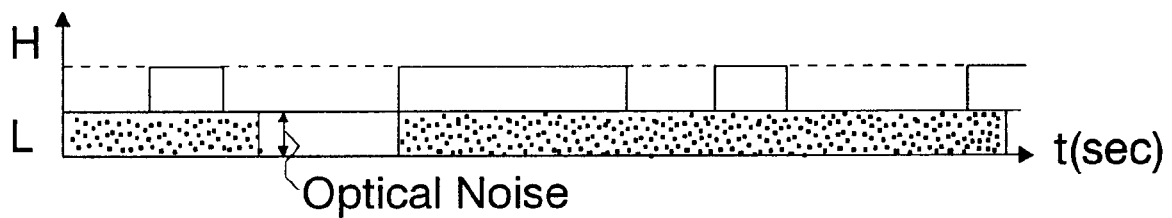
FIG. 5a to FIG. 5e are diagrams showing changes in the signal level over time in optical regeneration circuit 8 in FIG. 3.
Figure 5B:
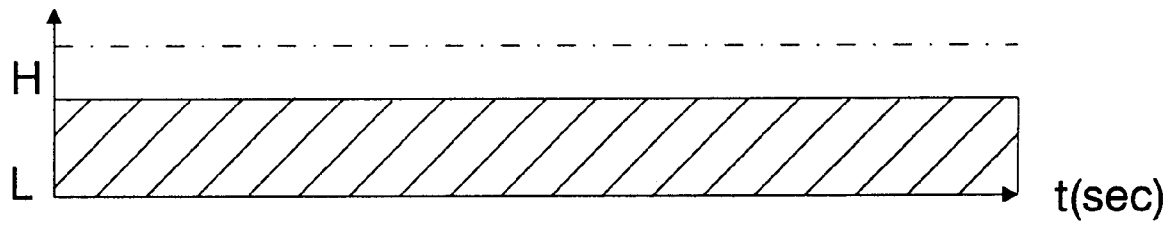
Figure 5C:
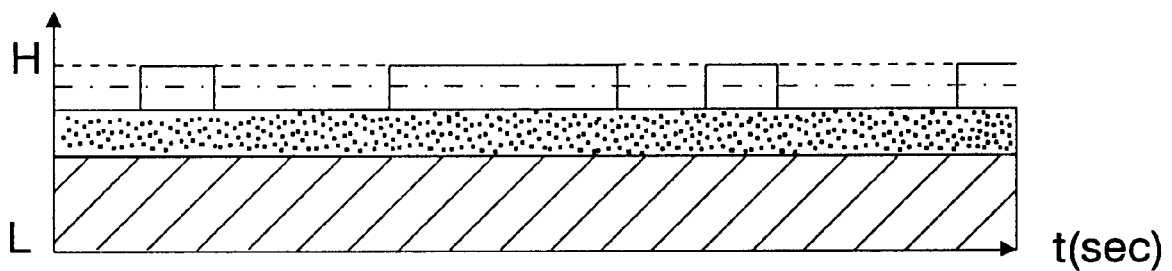

The signal light and the continuous light shown in FIG. 5a and FIG. 5b, respectively are composed by optical coupler 3 to obtain the composed signal light as shown in FIG. 5c where the alternate long and short dash line in FIG. 5c shows the threshold value level of saturable absorption type optical element 4 similarly to FIG. 5b.

The composed signal light shown in FIG. 5c is applied to saturable absorption type optical element 4, in which the signal light having the light intensity lower than the threshold value level is absorbed and only the composed signal light having the light intensity equal to or greater than the threshold value level is outputted from saturable absorption type optical element 4. Thus, saturable absorption type optical element 4 is saturated to allow the composed signal light to pass therethrough only when the signal light at wavelength $\lambda 1$ received through optical fiber 6 is at H level, while the composed signal light is absorbed and not allowed to pass therethrough when the signal light at wavelength $\lambda 1$ received though optical fiber 6 is at L level. The composed signal light outputted from saturable absorption type optical element in this way is shown in FIG. 5d.

Figure 5D:
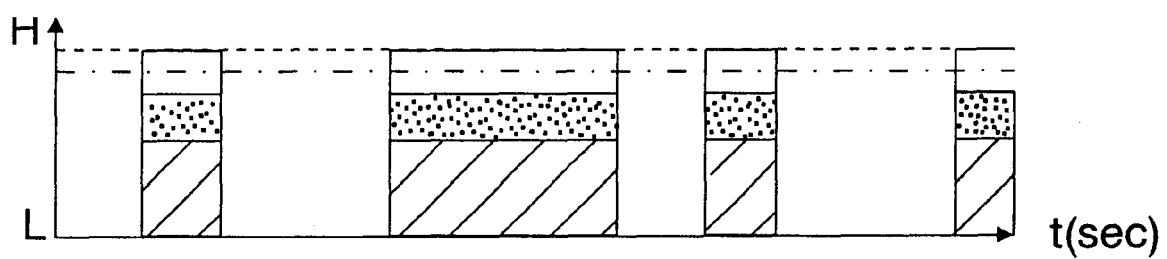
Figure 5E:
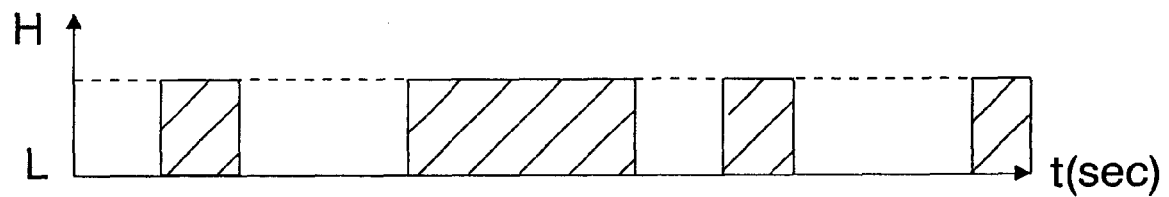

Finally, only the component of the signal light at wavelength $\lambda 2$ of the composed signal light shown in FIG. 5d is outputted by wavelength divider 5, thereby outputting the signal light as shown in FIG. 5e.

Next, the operation of optical regeneration circuit 8 in this embodiment will be described with reference to FIG. 6a to FIG. 6f which show spectra of the wavelength-light intensity.

Figure 6A:
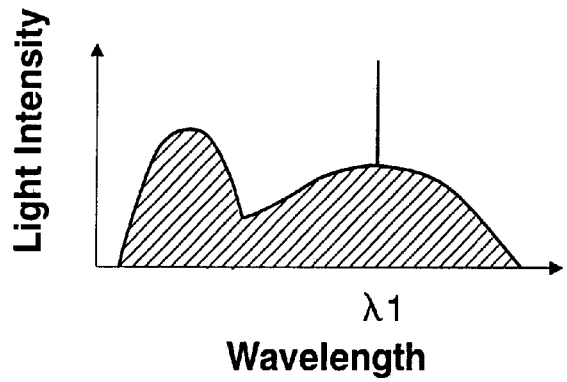
FIG. 6a to FIG. 6f are diagrams showing spectra of the wavelength-light intensity in optical regeneration circuit 8 in FIG. 3.

FIG. 6a shows the spectrum of a signal light from optical fiber 6 received at optical wavelength selector 2. Since this signal light has been relayed through multiple stages, not only the signal light at wavelength $\lambda 1$ but also much spontaneous emission optical noise is included therein, which lead to the deterioration of the signal to noise ratio. The portion indicated by hatching shows the spontaneous emission optical noise included.

Figure 6B:
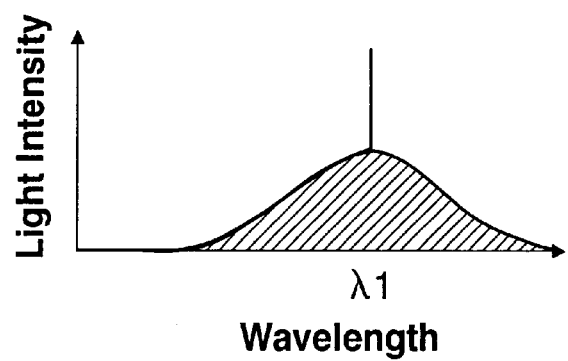

Referring to FIG. 6b which shows the spectrum of the signal light after the signal light shown in FIG. 6a has passed through optical wavelength selector 2, the signal light after passing optical wavelength selector 2 includes only the component at wavelength $\lambda 1$ that is extracted and the spontaneous emission light of the component at wavelength $\lambda 2$ is sufficiently removed.

Figure 6C:
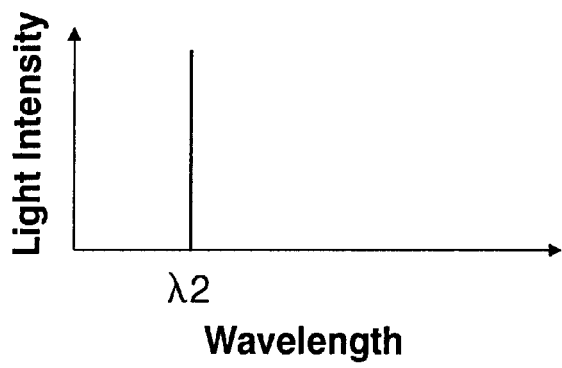

Referring to FIG. 6c, there is shown a spectrum of the continuous light at wavelength $\lambda 2$ outputted from light source 1.

Figure 6D:
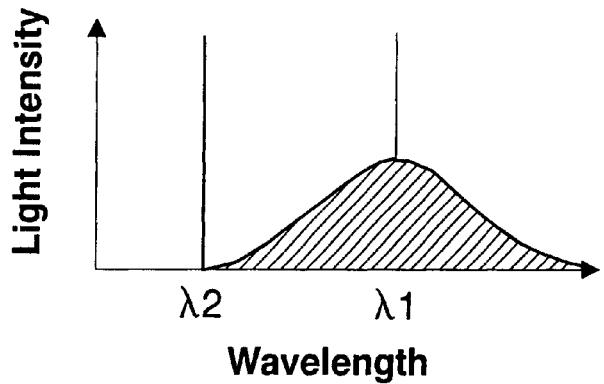

Referring to FIG. 6d, there is shown a spectrum of the composed signal light obtained by composing the signal light outputted from optical wavelength selector 2 and the continuous light outputted from light source 1 and outputted from optical coupler 3.

Figure 6E:
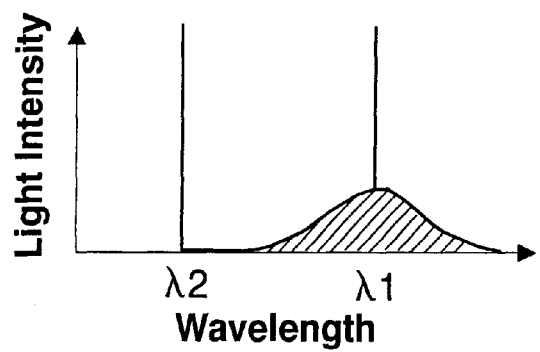

Referring to FIG. 6e, there is shown a spectrum of the signal light after the composed signal light shown in FIG. 6d have passed through saturable absorption type optical element 4.

Figure 6F:
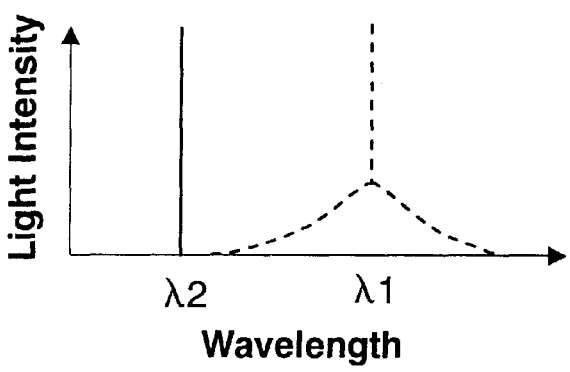

Referring to FIG. 6f, there is shown a spectrum of the signal light outputted from wavelength divider 5, that is, a signal regeneration light.

Optical regeneration circuit 8 according to the present embodiment can thus regenerate the signal light at wavelength $\lambda 2$ with no deterioration of the signal to noise ratio from the signal light at wavelength $\lambda 1$ having the deteriorated signal to noise ratio.

Second Embodiment

Figure 7:
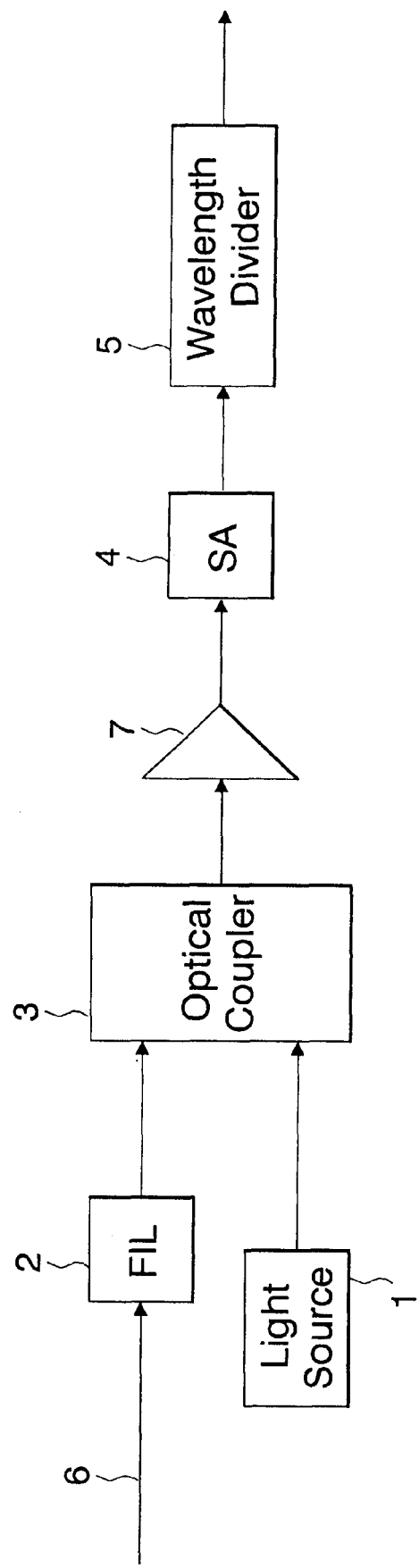
FIG. 7 is a block diagram showing a configuration of an optical regeneration circuit in an optical transmission system according to a second embodiment of the present invention.

Next, an optical transmission system according to a second embodiment of the present invention will be described. FIG. 7 shows a configuration of an optical regeneration circuit in the optical transmission system according to this embodiment.

The optical regeneration circuit in this embodiment, as shown in FIG. 7, is provided with optical amplifier 7 between optical coupler 3 and saturable absorption type optical element 4 in contrast with optical regeneration circuit 8 in the optical transmission system according to the first embodiment shown in FIG. 3.

This optical amplifier 7 is provided for controlling the light intensity of a signal light applied to saturable absorption type optical element 4 at an optimal level for a threshold value of saturable absorption type optical element 4.

The optical transmission system according to this embodiment, in addition to the effect of the first embodiment in FIG. 3, has an effect that the light intensity of the signal light applied to saturable absorption type optical element 4 can be set at an optimal level for the threshold value of saturable absorption type optical element 4.

Third Embodiment

Next, an optical transmission system according to a third embodiment of the present invention will be described.

Figure 8:
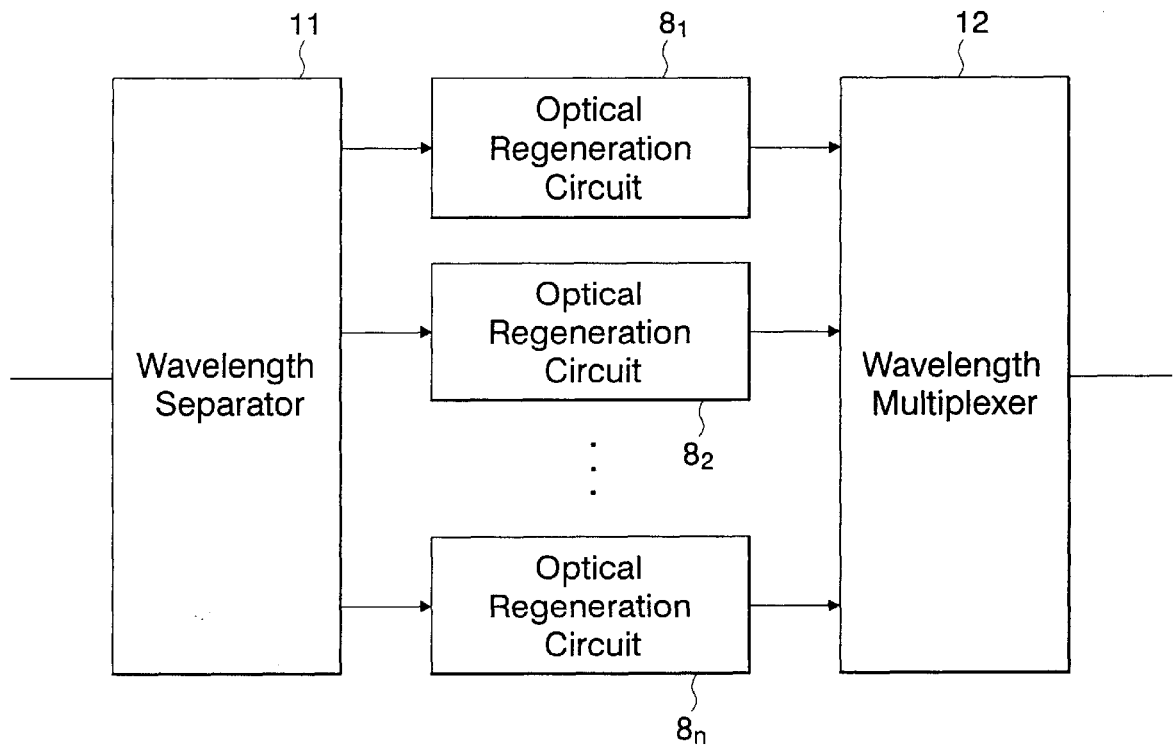
FIG. 8 is a block diagram showing a configuration of an optical regeneration device in an optical transmission system according to a third embodiment of the present invention.

This embodiment is an optical transmission system employing a wavelength multiplexing transmission scheme, in which a plurality of signal lights having different wavelengths are composed and transmitted in a single optical transmission path, and includes an optical regeneration device shown in FIG. 8 on the path of the optical transmission path. The optical regeneration device comprises wavelength separator 11, optical regeneration circuits $8_1$ to $8_n$, and wavelength multiplexer 12.

Wavelength separator 11 divides a wavelength multiplexing signal light, in which a plurality of signal lights having different wavelengths are composed, for each wavelength. Optical regeneration circuits $8_1$ to $8_n$ have a similar configuration to that of optical regeneration circuit 8 in the first or second embodiment except that the wavelength of signal lights to be applied and the wavelength of signal lights to be regenerated are different respectively. Wavelength multiplexer 12 composes the regenerated signal light outputted from optical regeneration circuits $8_1$ to $8_n$ to output the composed signal light as a wavelength multiplexing signal light.

This embodiment is an embodiment in which the optical regeneration circuit in the first or second embodiment is applied to the optical transmission system using the wavelength multiplexing transmission method and thus has the advantage similar to that of the first or second embodiment.

Fourth Embodiment

Next, an optical transmission system according to a fourth embodiment of the present invention will be described.

Figure 9:
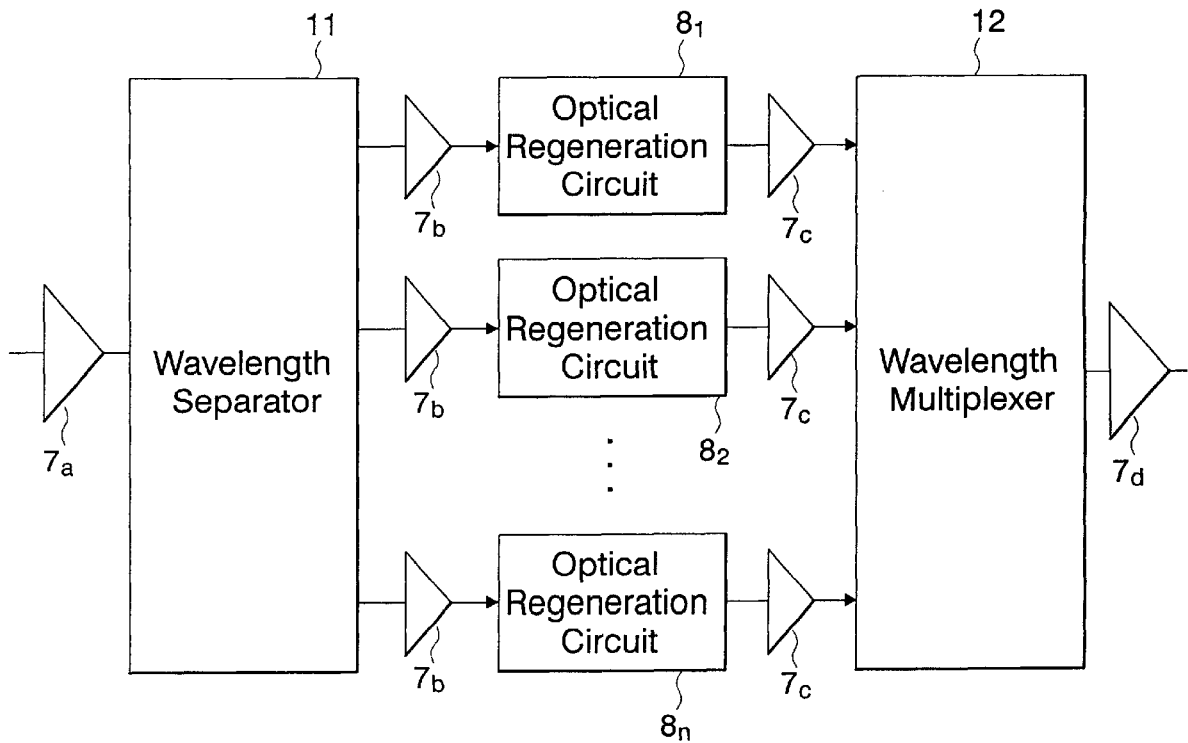
FIG. 9 is a block diagram showing a configuration of an optical regeneration device in an optical transmission system according to a fourth embodiment of the present invention.

As shown in FIG. 9, this embodiment differs from the optical regeneration device in the optical transmission system according to the third embodiment in FIG. 8 in that optical amplifier 7a is provided in an input portion of wavelength separator 11, amplifiers 7b are respectively provided between wavelength separator 11 and optical regeneration circuits $8_1$ to $8_n$, optical amplifiers 7c are respectively provided between optical regeneration circuits $8_1$ to $8_n$ and wavelength multiplexer 12, and optical amplifier 7d is provided between wavelength multiplexer 12 and optical fiber 6.

Optical amplifier 7a amplifies a input signal light subjected to attenuation due to the optical fiber loss. Optical amplifiers 7b are intended for setting the light intensity of signal lights received at optical regeneration circuits $8_1$ to $8_n$ at an optimal level for a threshold value of saturable absorption type optical element 4. Optical amplifiers 7c are intended for setting signal lights at respective wavelengths outputted from optical regeneration circuits $8_1$ to $8_n$ to a specified light intensity. Optical amplifier 7d is intended for setting signal light outputted from wavelength multiplexer 12 to a predetermined input level of optical fiber 6 for performing an optimal transmission.

The optical transmission system according to this embodiment, in addition to the advantage of the third embodiment in FIG. 8, has an advantage that the light intensity of the signal lights to be received at wavelength separator 11, saturable absorption type optical elements 4 of optical regeneration circuits $8_1$ to $8_n$, wavelength multiplexer 12, and optical fiber 6 can be set independently at the respective optimal levels.

Fifth Embodiment

Next, an optical transmission system according to a fifth embodiment of the present invention will be described.

Figure 10:
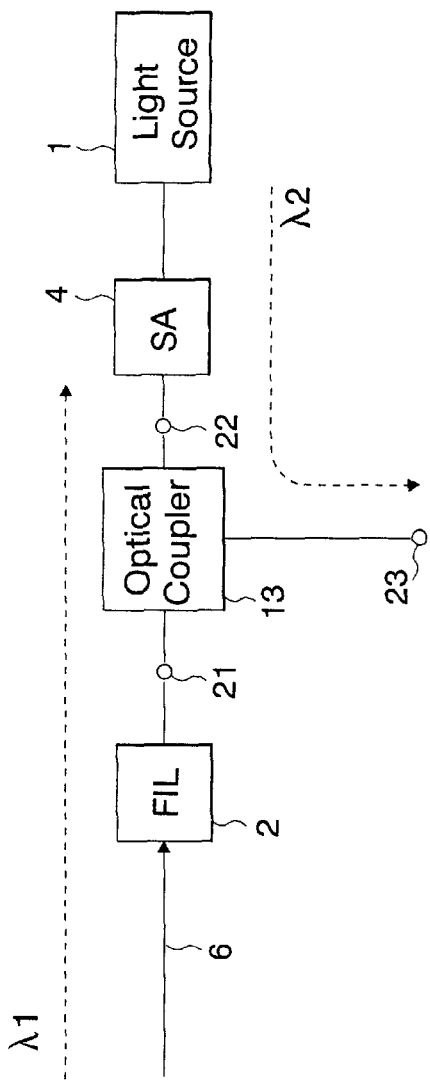
FIG. 10 is a block diagram showing a configuration of an optical regeneration circuit in an optical transmission system according to a fifth embodiment of the present invention.

As shown in FIG. 10, the optical regeneration circuit comprises light source 1, optical wavelength selector 2, saturable absorption type optical element 4, an optical divider 13.

Saturable absorption type optical element 4 has a saturable absorption region, adds the light intensity of a continuous light from light source 1 applied at one terminal and the light intensity of a signal light from optical divider 13 applied at the other terminal.
When the added value is below a threshold value of the saturable absorption region, saturable absorption type optical element 4 absorbs almost all the continuous light and the signal light and when the added value is equal to or above the threshold value, saturable absorption type optical element 4 allows the continuous light to pass therethrough and outputs the continuous light as a regenerated signal light at the other terminal.
Optical divider 13 includes terminal 21 connected to optical wavelength selector 2, terminal 22 connected to saturable absorption type optical element 4, and output terminal 23 through which the regenerated signal light is outputted to the outside. A signal light received from optical wavelength selector 2 at terminal 21 is outputted to saturable absorption type optical element 4 at terminal 22. The regenerated signal light received from saturable absorption type optical element 4 at terminal 22 is outputted to terminal 23 for output to the outside.

The dotted lines in FIG. 10 shows traveling paths of the signal light at wavelength λ1 and the continuous light at wavelength λ2, respectively.

In the optical regeneration circuit in this embodiment, the traveling direction of the signal light at wavelength λ1 received from the outside is different from the traveling direction of the continuous light at wavelength λ2 outputted from light source 1, so that wavelength λ1 and wavelength λ2 can be made equal to each other.

Sixth Embodiment

Figure 11:
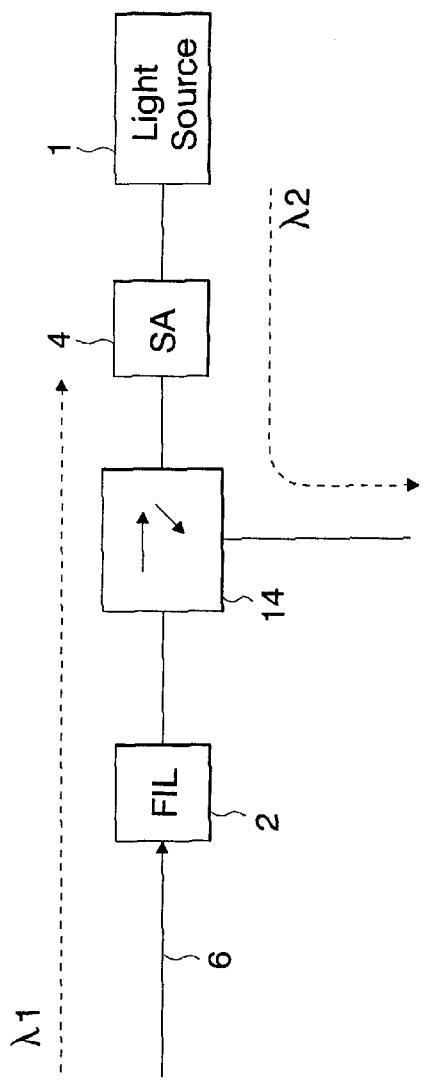
FIG. 11 is a block diagram showing a configuration of an optical regeneration circuit in an optical transmission system according to a sixth embodiment of the present invention.

Next, an optical transmission system according to a sixth embodiment of the present invention will be described with reference to FIG. 11.

The optical transmission system according to this embodiment uses optical circulator 14 in the fifth embodiment in FIG. 10 as a specific example of optical coupler 13. Since the operation and effect of this embodiment is similar to those of the optical regeneration circuit in the fifth embodiment shown in FIG. 10, the description thereof are omitted.

Although the optical transmission systems according to the above-mentioned first to sixth embodiments have been described in a case where a signal light continuous in time is transmitted, the present invention is not limited thereto, and can be similarly applied to a time-division multiplexing transmission system.

While preferred embodiments of the present invention have been described using specific terms, such description is for illustrative purposes only, and it is to be understood that changes and variations may be made without departing from the spirit or scope of the following claims.

What is claimed is:

1. An optical regeneration circuit comprising:
   optical wavelength selecting means for passing therethrough, from an incident signal light which includes a noise light, only a component at a wavelength of the signal light;
   a light source for outputting a continuous light at a certain constant wavelength;
   a saturable absorption type optical element having a saturable absorption region, for adding a light intensity of the continuous light received from said light source at one terminal and a light intensity of the signal light received at another terminal, for absorbing almost all the continuous light and the signal light when the added value is lower than a threshold value of the saturable absorption region, and for passing therethrough transmit the continuous light to output the passed light as a regenerated signal light at the other terminal when the added value is equal to or greater than said threshold value; and
   optical dividing means including a first terminal connected to said optical wavelength selecting means, a second terminal connected to said saturable absorption type optical element and an output terminal through which the regenerated signal light is outputted to the outside, for outputting the signal light received from said optical wavelength selecting means at the first terminal to said saturable absorption type optical element at the second terminal, and for outputting to the output terminal the regenerated signal light received from said saturable absorption type optical element at the second terminal.

2. The optical regeneration circuit according to claim 1, wherein a wavelength of the signal light and a wavelength of the continuous light are substantially equal to each other.

3. The optical regeneration circuit according to claim 1, wherein said optical dividing means is an optical circulator.

4. The optical regeneration circuit according to claim 1, wherein said wavelength selecting means is an optical band pass filter.

5. An optical regeneration device comprising:

wavelength separating means for composing a wavelength multiplexing signal light in which a plurality of signal lights having different wavelengths are composed for each wavelength;

a plurality of optical regeneration circuits according to claim 1, for receiving the respective signal lights divided by said wavelength separating means to output regenerated signal lights; and wavelength multiplexing means for composing the respective regenerated signal lights outputted by said respective optical regeneration circuits to output the composed signal as a wavelength multiplexing signal light.

6. The optical regeneration device according to claim 5, further comprising optical amplifying means at an input terminal of said wavelength separating means, at input terminals and output terminals of said respective optical regeneration circuits, and at an output terminal of said wavelength multiplexing means.

7. An optical transmission system comprising:

an optical transmitter for wavelength-multiplexing a signal light, and for outputting the wavelength composed signal light;

an optical receiver for receiving the wavelength composed signal light;

an optical fiber for connecting between said optical transmitter and said optical receiver;

optical amplifying means provided on the path of said optical fiber, for amplifying a light intensity of the signal light passing through the optical fiber; and an optical regeneration circuit according to claim 5, provided on the path of said optical fiber.

8. An optical transmission system comprising:

an optical transmitter for outputting a signal light;

an optical receiver for receiving the signal light;

an optical fiber for connecting between said optical transmitter and said optical receiver;

optical amplifying means provided on the path of optical fiber, for amplifying a light intensity of the signal light passing through the optical fiber; and an optical regeneration circuit according to claim 1 provided on the path of said optical fiber.

* * * * *